US007787409B2

(12) United States Patent
Sanderford, Jr.

(10) Patent No.: US 7,787,409 B2
(45) Date of Patent: Aug. 31, 2010

(54) CONTAINERIZED CARGO/HIGH VALUE ASSET TRACKING METHOD, DEVICE AND SYSTEM

(75) Inventor: H. Britton Sanderford, Jr., New Orleans, LA (US)

(73) Assignee: Southern Focus Investments, LLC, Mandeville, LA (US)

( * ) Notice: Subject to any disclaimer, the term of this patent is extended or adjusted under 35 U.S.C. 154(b) by 1514 days.

(21) Appl. No.: 11/045,314

(22) Filed: Jan. 31, 2005

(65) Prior Publication Data

US 2005/0185659 A1 Aug. 25, 2005

Related U.S. Application Data

(60) Provisional application No. 60/540,409, filed on Jan. 30, 2004.

(51) Int. Cl.
*H04B 7/216* (2006.01)

(52) U.S. Cl. ....................... 370/318; 370/320; 455/12.1

(58) Field of Classification Search ....................... None
See application file for complete search history.

(56) References Cited

U.S. PATENT DOCUMENTS

| | | | | |
|---|---|---|---|---|
| 5,870,396 | A * | 2/1999 | Abu-Amara et al. | 370/413 |
| 6,026,092 | A * | 2/2000 | Abu-Amara et al. | 370/411 |
| 6,411,607 | B1 * | 6/2002 | Robert et al. | 370/316 |
| 7,257,371 | B1 * | 8/2007 | Bettinger et al. | 455/13.2 |
| 7,301,925 | B2 * | 11/2007 | Fan et al. | 370/338 |
| 7,359,344 | B1 * | 4/2008 | Cheng et al. | 370/321 |
| 2002/0159441 | A1 * | 10/2002 | Travaly et al. | 370/352 |
| 2002/0168936 | A1 * | 11/2002 | Zilberstein et al. | 455/12.1 |
| 2003/0054816 | A1 * | 3/2003 | Krebs et al. | 455/428 |
| 2003/0169710 | A1 * | 9/2003 | Fan et al. | 370/338 |
| 2004/0203789 | A1 * | 10/2004 | Hammond et al. | 455/440 |
| 2005/0259598 | A1 * | 11/2005 | Griffin et al. | 370/255 |

* cited by examiner

*Primary Examiner*—Bob A Phunkulh
(74) *Attorney, Agent, or Firm*—Oblon, Spivak, McClelland, Maier & Neustadt, L.L.P.

(57) ABSTRACT

A cargo, containerized cargo, high value asset monitoring and tracking communication system including a local area network (LAN) transmitter that transmits a first message having a first frequency spectrum, and a wide area network (WAN) uplink device that receives the first message from the local area network radio transmitter, whereby both WAN and LAN share the same spectrum. Further, the WAN uplink device transmits a second message having a second frequency spectrum overlapping the first frequency spectrum to a WAN receiver using an orbital satellite. At least one of the LAN transmitter and the WAN uplink device transmits with a transmission characteristic different from a transmission characteristic of the other. A communication device and method include similar features.

41 Claims, 8 Drawing Sheets

CONTAINERIZED CARGO/HIGH VALUE ASSET TRACKING METHOD, DEVICE AND SYSTEM

CROSS-REFERENCE TO RELATED APPLICATIONS

This application claims priority to U.S. Provisional Application No. 60/540,409, filed Jan. 30, 2004, the entire contents of which are incorporated herein by reference.

BACKGROUND OF THE INVENTION

1. Field of the Invention

The present invention is related to the field of wide area network (WAN) and local area network (LAN) communication methods, devices and systems. In particular, the present invention relates to WAN/LAN communication methods, devices and systems for cargo, containerized cargo, and high value asset tracking and management.

2. Discussion of the Background

Cargo items are transported through different regions of the world using various modes of transportation. It is common for a particular cargo item to be transported through one or more different geographic regions or political regions as it is transported from a source location to a destination location. Further, a party with an interest in the cargo items is frequently interested in managing cargo item data before, during and after this transportation. Cargo management tasks typically include at least tracking the location of the cargo item from a tracking location. Cargo management systems have been proposed that use WAN/LAN technology for cargo item tracking.

An example of a background cargo item tracking system, shown in FIG. 7, includes WAN transmitters 702/708 that communicate with an orbital satellite 700 via WAN links 714/716. Each WAN transmitter 702/708 receives information about the first and second cargo items 706/712 via first and second cargo sensors 704/710, and each WAN transmitter 702/708 sends the received cargo item information to a remote tracking location 714 via an orbital satellite 700. However, this background cargo tracking system only includes a remote management feature and does not include a local management feature that would provide a tracking or a management function for a user located near the cargo, without receiving information through the orbital satellite. Further, to effectively send information from WAN transmitters 702/708 to satellite 700, each of the WAN transmitter's 702/708, and therefore each of the cargo items, are physically situated with adequate clearance from obstacles such that a satellite radio signal may be transmitted without signal degradation. In situations where cargo items are stacked on top of each other, or are located in an obstructed area such as a ship cargo hold or truck container, there is a problem of physically situating each cargo item with adequate clearance from obstacles.

FIG. 8 shows a second background cargo item tracking system that includes wireless LAN (WLAN) transmitters 806/808 that receive information about first and second cargo items 814/816 from first and second cargo sensors 810/812. The first and second WLAN transmitters 806/808 transmit this information to local management station 818 using WLAN signals 826/824 and to WLAN receiver 804 using WLAN signals 820 and 822. WLAN signals 820/822 are signals according to a background wireless LAN communication standard, such as IEEE 802.11, which uses a first frequency spectrum. A WAN transmitter 802 receives the cargo item information from the WLAN receiver 804 and transmits the cargo information to an orbital satellite 800 using WAN signal 828 and to remote management location 822 via communication link 830. WAN signal 828 is according to a background WAN signal communication standard, such as HDLC, which uses a second frequency spectrum.

However, the background cargo tracking systems also do not adequately address several additional problems. Each of the geographic regions (e.g., mountain region, ocean region, etc. . . . ) or political regions (e.g., separately administered locality, state, nation, etc. . . . ) through which the cargo items are transported may differently require or regulate the communication spectrum allocated for the purposes of LAN communication. For example, communication according to the wireless LAN communication standard IEEE 802.11 is not allowed in all political regions of the world.

Further, each mode of transportation (e.g., truck, rail, car, air, ship, etc. . . . ) and packaging arrangement (e.g., container, palette, case, etc. . . . ) employed to transport the cargo may further limit the available spectra. For example, when transporting cargo items by truck through a mountain region of a first nation, a first LAN communication spectrum may be preferred or required; however, when transporting cargo items within stacked rail containers through an ocean region on a ship, a second LAN communication spectrum may be preferred or required. Thus, background systems also do not adequately address the problem of operating within different modes of transportation, packaging arrangements and regions.

In addition, cost and complexity of background LAN communication devices used to communicate cargo item information are high due to the need for supporting various different LAN communication spectra to communicate in different regions and packing arrangements.

SUMMARY OF THE INVENTION

Accordingly, one object of this invention is to provide a novel communication system including a local area network (LAN) transmitter configured to transmit a first message having a first frequency spectrum, a wide area network (WAN) uplink device configured to receive the first message from the LAN radio transmitter and transmit a second message having a second frequency spectrum overlapping the first frequency spectrum to a WAN receiver using an orbital satellite, and at least one of the LAN transmitter and the WAN uplink device configured to transmit with a transmission characteristic different from a transmission characteristic of the other.

Another object of this invention is to provide a novel network communication device including a local area network (LAN) receiver configured to receive a first message having a first frequency spectrum, a wide area network (WAN) transmitter configured to transmit a second message having a second frequency spectrum overlapping the first frequency spectrum to a WAN receiver using an orbital satellite, and the WAN transmitter further configured to transmit the second message with a transmission characteristic different than that of the first message received by the LAN receiver.

Another object of this invention is to provide a novel network communication device including a local area network/wide area network (LAN/WAN) transmitter configured to transmit a first LAN message having a first frequency spectrum and to transmit a WAN message having a second frequency spectrum overlapping the first frequency spectrum to a WAN receiver using an orbital satellite, a LAN receiver configured to receive a second LAN message having the first frequency spectrum, a sensor interface configured to receive a sensed cargo information from an operatively connected cargo sensor and add the sensed cargo information to the first LAN message, and the LAN/WAN transmitter further configured to transmit the second message with a transmission characteristic different than that of at least one of the first LAN message transmitted by the LAN/WAN transmitter and the second LAN message received by the LAN receiver.

Another object of this invention is to provide a novel network communication device including a local area network (LAN) transmitter configured to transmit a first message having a first frequency spectrum overlapping a second frequency spectrum of a second message received by an orbital satellite, a sensor interface configured to receive a sensed cargo information from an operatively connected cargo sensor and add the sensed cargo information to the spread spectrum local area network radio message, and the LAN transmitter is further configured to transmit the second message with a transmission characteristic different than that of the second message received by the satellite receiver.

Another object of this invention is to provide a novel communication method, including transmitting a first message having a first frequency spectrum from a local area network (LAN) transmitter, receiving the first message from the LAN transmitter at a wide area network (WAN) uplink device, transmitting a second message having a second frequency spectrum overlapping the first frequency spectrum to a WAN receiver using an orbital satellite, and at least one of the transmitting a first message and transmitting a second message further comprising transmitting with a transmission characteristic different from a transmission characteristic of the other.

Another object of this invention is to provide a novel communication system including a local area network/wide area network (LAN/WAN) transmitter configured to transmit a first message having a first frequency spectrum and transmit a second message having a second frequency spectrum overlapping a first frequency spectrum to a WAN receiver using an orbital satellite, and the LAN/WAN transmitter is further configured to transmit the first message with a transmission characteristic different than that of the second message received by the WAN receiver or the orbital satellite.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
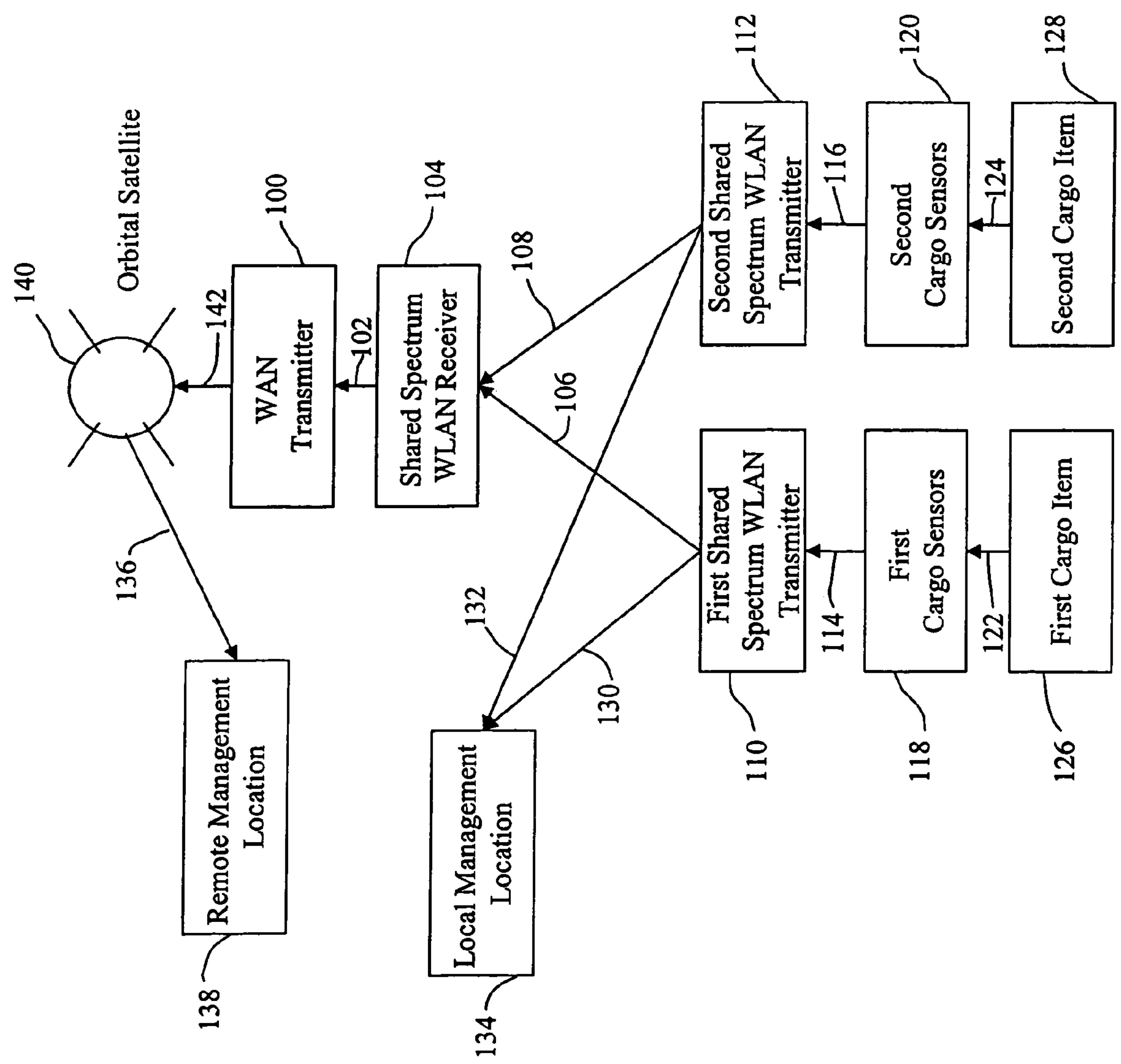
FIG. 1 is a block diagram of a cargo management communication system according to an embodiment of the present invention.

Referring now to the drawings, wherein like reference numerals designate identical or corresponding parts throughout the several views, and more particularly to FIG. 1 thereof, which shows a WAN/LAN communication system according to an embodiment of the present invention. This embodiment includes at least first and second shared spectrum WLAN transmitters 110/112 configured to receive information about first and second cargo items 126/128 via first and second cargo sensors 118/120.

Each cargo sensor collects information regarding at least one associated cargo item via sensing interface 122/124. The cargo sensors include at least one of a location sensor, for example a GPS receiver; one or more container sensors, for example, temperature (including the temperature of perishable goods in a "reefer" container), door open, container volume, vibration/shock, accelerometer, acoustic pressure, sound, light in container, passive infrared (PIR) (such as those used to detect changes in heat for security motion sensors), microwave, dust, humidity, security/tampering, or orientation sensors, or other sensors for collecting information about the status of a cargo item or container, the environment of the cargo item or container, or other information of interest. The cargo sensors 118/120 are connected to shared spectrum WLAN transmitters 110/112 via sensor links 114/116 and may be provided near or far from the WLAN transmitters 110/112, or near or far from the cargo item as appropriate for the type of sensor and cargo.

A shared spectrum WLAN receiver 104 is configured to receive the first and second cargo information from first and second shared spectrum WLAN transmitters 110/112 via shared spectrum WLAN signals 106/108. Further, local management location 134 is also configured to receive the first and second cargo information from the first and second shared spectrum WLAN transmitters 110/112 via shared spectrum WLAN signals 130/132 or via shared spectrum WLAN signals 106/108 (not shown). The shared spectrum WLAN signals 130/132 include spread spectrum modulated data. For example, the WLAN signals 130/132 include a header, an ID, status bits, data payload and error detection/correction bits.

A WAN transceiver 100 is configured to receive the first and second cargo information from the shared spectrum WLAN receiver 104 and to transmit WAN signal 142 including the cargo information to orbital satellite 140. The WAN signal 142 includes spread spectrum modulated data. An orbital satellite 140 transmits the cargo information to remote management location 138 via communication link 136. Each of remote management location 138 and local management location 134 are configured to provide monitoring and management features using the received cargo information.

In the present embodiment, a communication frequency spectrum of the spread spectrum encoded data of each of the shared spectrum WLAN signals 106/108/130/132 is the same as a communication frequency spectrum of the spread spectrum encoded data of the WAN signal 142. Alternative embodiments are also possible in which a portion of the communication frequency spectrum of each of the shared spectrum WLAN signals 106/108/130/132 overlaps at least a portion of the communication frequency spectrum of the WAN signal 142. A further alternative is the use of narrow band satellite data communication whereby the near/far effect and FM capture are used to allow both WAN and LAN to co-exist on the same spectrum.

Each of the WAN signal and the WLAN signals include spread spectrum modulated data according to a standard message format and protocol, for example, according to a direct sequence satellite communication message format protocol as used in the GlobalStar satellite. For example, the WLAN signals may include Direct Sequence Spread Spectrum (DSSS) with Binary Phase Shift Keying (BPSK) modulated data, though other modulation and encoding schemes are also possible. Further, the WLAN signals include, for example, a header, status bits, data payload and error detection bits.

The WLAN signals 106/108/130/132 and WAN signal 142 are configured to minimize the effects of possible interference with each other by arranging the power of the WAN signal 142 sufficient to send data to the orbiting satellite and arranging the power of the shared spectrum WLAN signals 106/108/130/132 at a lower power than the WAN signal 142. The power of the WLAN signals 106/108/130/132 is sufficient to send data to local management location 134 and shared spectrum WLAN receiver 104. However, the power of the WLAN signals 106/108/130/132 is insufficient to be demodulated by the orbital satellite. Further, the power of the WLAN signals 106/108/130/132 is also configured such that the orbital satellite does not demodulate sufficient energy from a temporal LAN message collision to materially reduce reception of messages intended for the satellite.

In another alternative embodiment, the WLAN signals 106/108/130/132 and WAN signal 142 are configured to minimize the effects of possible interference with each other based on a difference of code division multiple access (CDMA) codes. In particular, the WAN signal 142 is configured to use a first CDMA code and WLAN signals 106/108/130/132 are configured to use a second CDMA code different from the first, such that the orbital satellite does not demodulate sufficient energy from a temporal LAN message collision to materially reduce reception of messages intended for the satellite. The first and second CDMA codes are configured to use at least one of a different Direct Sequence Spread Spectrum (DSSS) hop pattern code and a different Frequency Hopping Spread Spectrum (FHSS) hop pattern code.

In another alternative embodiment, the WLAN signals 106/108/130/132 and WAN signal 142 are configured to minimize the effects of possible interference with each other based on a difference of message duration. In particular, the WAN signal 142 is configured to transmit messages having a first message duration and WLAN signals 106/108/130/132 are configured to transmit messages having a second message duration that is shorter than the first message duration such that an error correcting feature of the remote management location 138 or of a receiver (not shown) in the orbital satellite 140 can eliminate or otherwise ignore a portion of a WLAN signal 106/108/130/132 that collides in time (e.g., that is received at the same time as WAN signal 142).

In another alternative embodiment, the WLAN signals 106/108/130/132 and WAN signal 142 are configured to minimize the effects of possible interference with each other based on the use of a difference in data rate and redundant transmissions. In particular, the WAN signal 142 is configured to communicate data at a first message rate and the WLAN signals 106/108/130/132 are configured to communicate data at a second data rate that is higher than the first data rate. Further, at least one of the remote management location or a receiver in the satellite is configured to recover from temporal message collisions that occur when a WAN signal 142 is received at the same time as a WLAN signal 106/108/130/132 by using an error correction code, and the WLAN receiver 204 is configured to recover from a temporal message collisions that occur when a WAN signal 142 is received at the same time as a WLAN signal 106/108/130/132 by using a redundant transmission occurring over a period of time at least longer than a duration of a WAN transmission.

Thus, by sharing all or at least a portion of the communication spectrum between WLAN signals and WAN signals, the present embodiment advantageously allows the WLAN signals to operate using a satellite radio frequency spectrum that is already allocated for communication purposes throughout most regions. Thus, the WLAN signals comply with local requirements throughout most political regions and further are compatible with most geographical regions. Hence, the local management feature is able to operate in a greater number of regions.

In addition, because each cargo item is associated with a shared spectrum WLAN transmitter that communicates with a ground based WLAN receiver, it is not necessary for each cargo item to be physically situated with adequate clearance from obstacles such that a satellite radio signal may be transmitted without signal degradation. Thus, the present system allows greater flexibility with regard to cargo item placement and results in more reliable communication of cargo item information.

Figure 2:
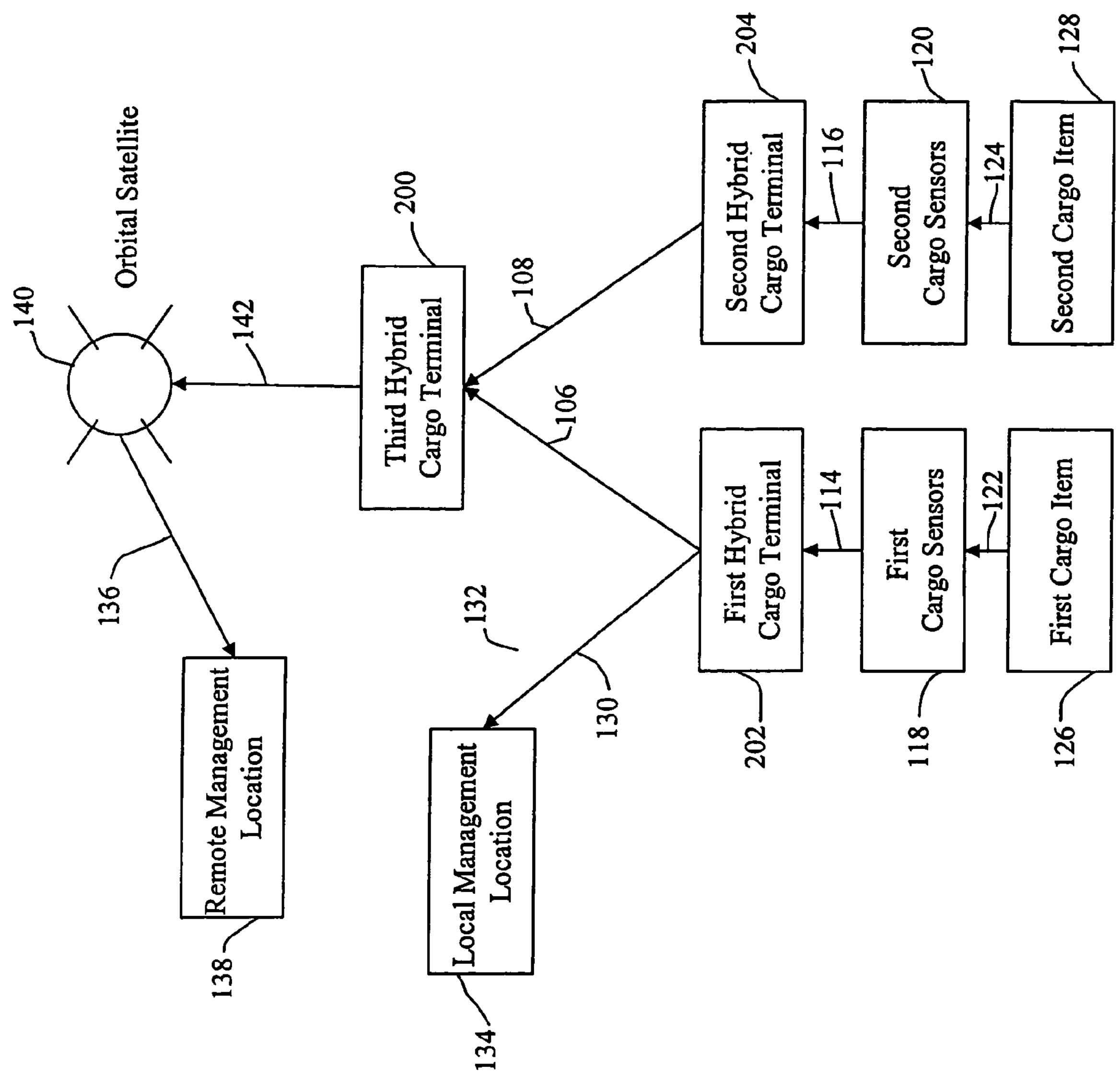
FIG. 2 is a block diagram of a cargo management communication system according to another embodiment of the present invention.

FIG. 2 shows an example of a cargo management system according to another embodiment of the present invention. Parts of the cargo management system in this example are the same as in embodiments described above. However, this example includes first, second and third hybrid cargo terminals 202/204/200, each configured to perform a WLAN function and a WAN function. First and second hybrid cargo terminals 202/204 are configured to perform a WLAN function and are configured to receive cargo item information from first and second cargo items 126/128 via first and second cargo sensors 118/120 as described above. Further, the first and second hybrid cargo terminals 202/204 are configured to transmit WLAN signals 106/108 to the third hybrid cargo terminal 200 and to transmit WLAN signals 130/132 to the local management location 134. The third hybrid cargo terminal 200 is configured to receive cargo information in the WLAN signals 106/108 from the cargo terminals and to transmit the cargo in WAN signal 142 to the orbital satellite 140.

Figure 3:
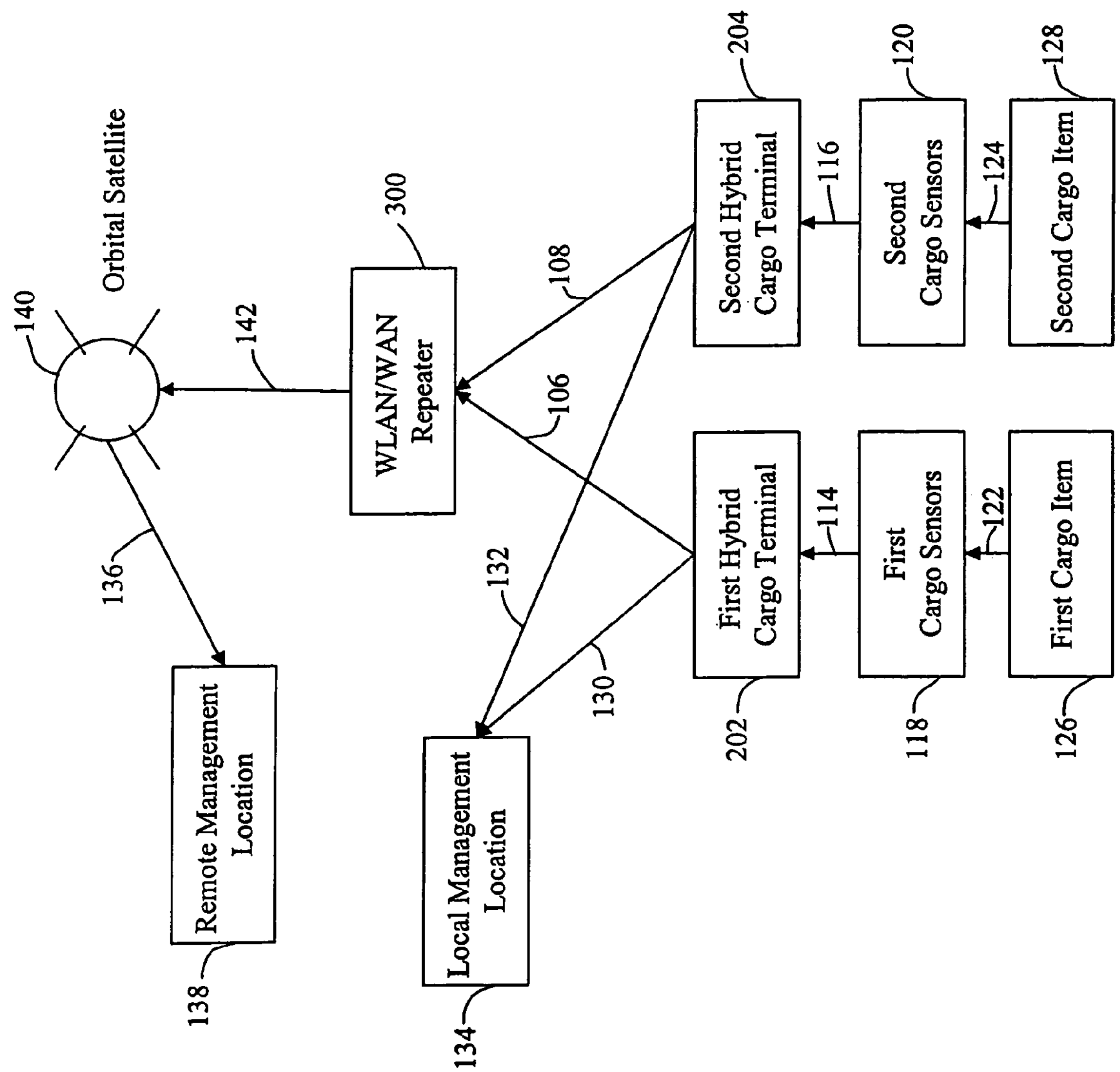
FIG. 3 is a block diagram of a cargo management communication system according to another embodiment of the present invention.

FIG. 3 shows an example of a cargo management system according to another embodiment of the present invention. Parts of the cargo management system in this example are the same as in the example of FIG. 2. However, this example includes WLAN/WAN repeater 300 configured to receive WLAN signals 106/108 from the hybrid cargo terminals (or in an alternative embodiment, from shared spectrum WLAN transmitters) and retransmit each received signal at an increased power level to form WAN signal 142.

Figure 4:
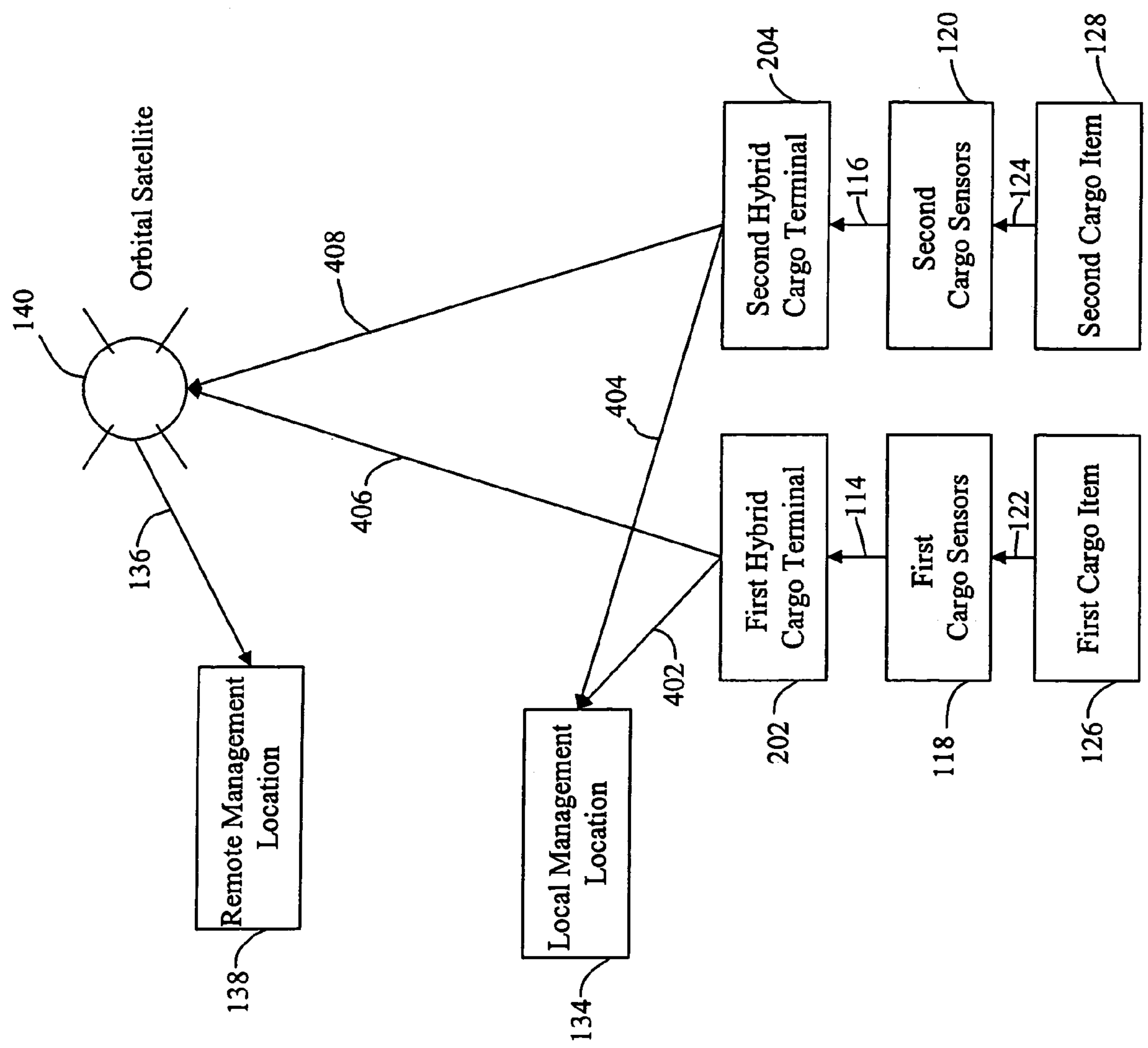
FIG. 4 is a block diagram of a cargo management communication system according to another embodiment of the present invention.

FIG. 4 shows an example of a cargo management system according to another embodiment of the present invention. Parts of the cargo management system in this example are the same as in the example of FIG. 2. However, in this example, the first and second hybrid cargo terminals are configured to transmit WLAN signals 402/404 to the local management location 134 and to transmit WAN signals 406/408 to the orbital satellite 140.

Further, the features of the invention are not limited to the arrangement of functions shown in cargo management system examples FIGS. 1-4, but include at least each permutation of the features represented therein.

Figure 5:
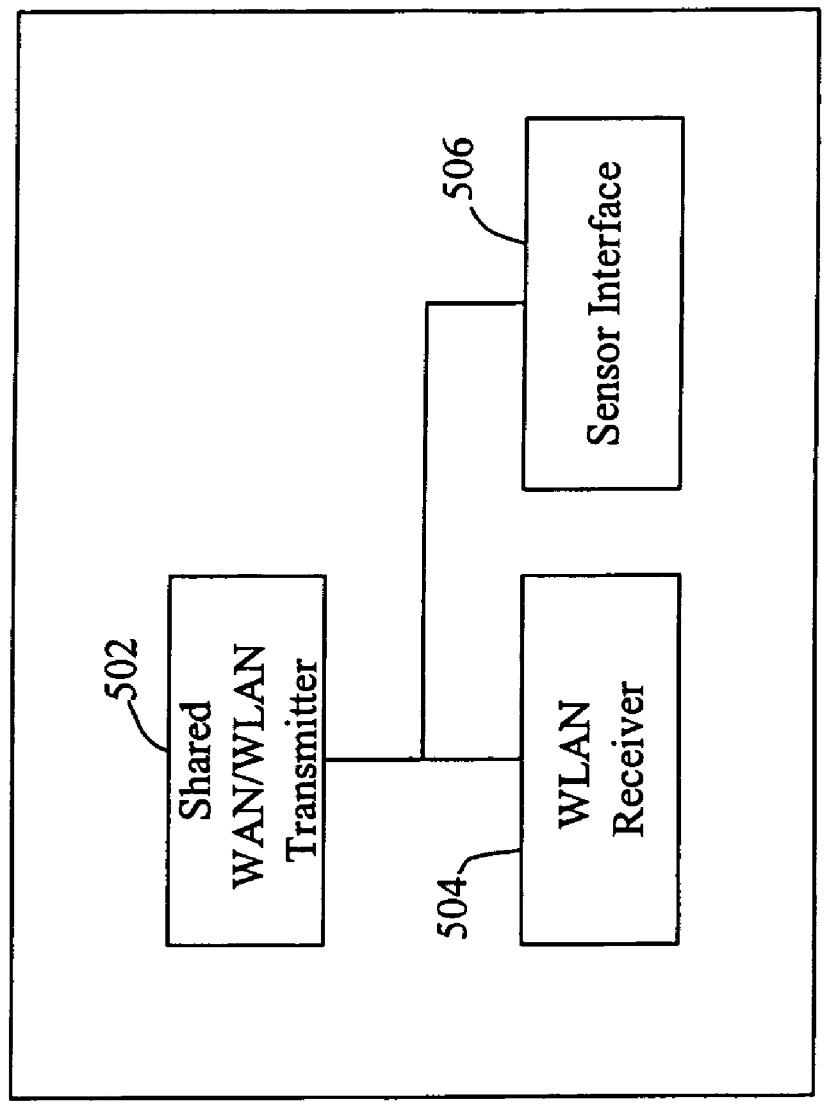
FIG. 5 is a block diagram of a communication device according to an embodiment of the present invention.

FIG. 5 shows an example of a hybrid cargo terminal 500 according to an embodiment of the present invention. The hybrid cargo terminal 500 includes a shared WAN/WLAN transmitter 502 operatively connected to WLAN receiver 504 and sensor interface 506. The WLAN receiver 504 is configured to receive WLAN signals from a wireless local area network and perform a LAN receiving function on those signals. The LAN receiving function includes functions such as monitoring, filtering, segmenting, parsing, interpreting or packaging the received WLAN signals to produce LAN messages for the WAN/WLAN transmitter. The sensor interface 506 is configured to receive cargo item information from cargo sensors.

The shared WAN/WLAN transmitter 502 is configured to receive cargo item information from the sensor interface and to produce and transmit a WLAN signal including that information. The WAN/WLAN transmitter 502 is also configured to receive the LAN messages from the WLAN receiver 504 and to produce a WAN signal based on the received LAN messages.

Because the WAN and WLAN signals produced by the WAN/WLAN transmitter share a common radio frequency spectrum or overlapping radio frequency spectrums, the WAN/WLAN transmitter is less complex than other combinations of WAN and WLAN transmitters that transmit WAN and WLAN signals having different radio frequency spectra. For example, the WAN/WLAN transmitter may be implemented using common elements to perform WAN and WLAN signals such as a common antenna, common power amplifier, common power supply, or common transmitter control logic. Thus, the WAN/WLAN transmitter exhibits benefits in size, weight, cost, and reliability, for example, and therefore exhibits resulting benefits in flexibility of deployment and use, reduced power dissipation, increased battery life, reduced shipping costs, and reduced fuel costs, for example.

Figure 6:
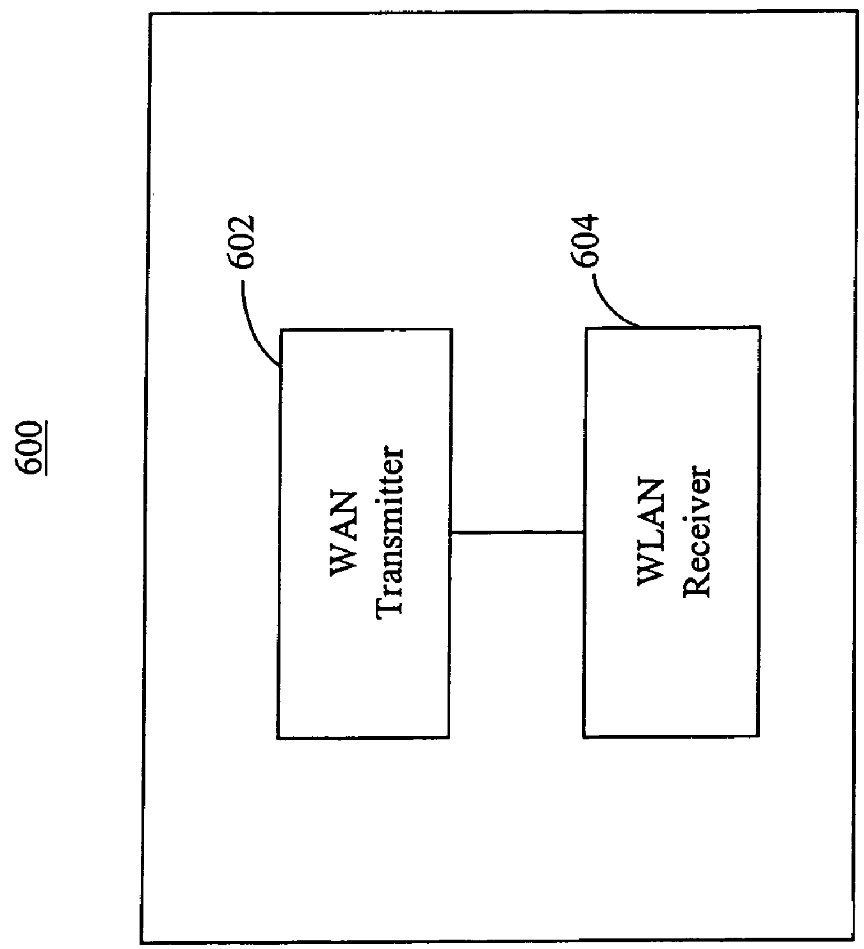
FIG. 6 is a block diagram of a communication device according to another embodiment of the present invention.
Figure 7:
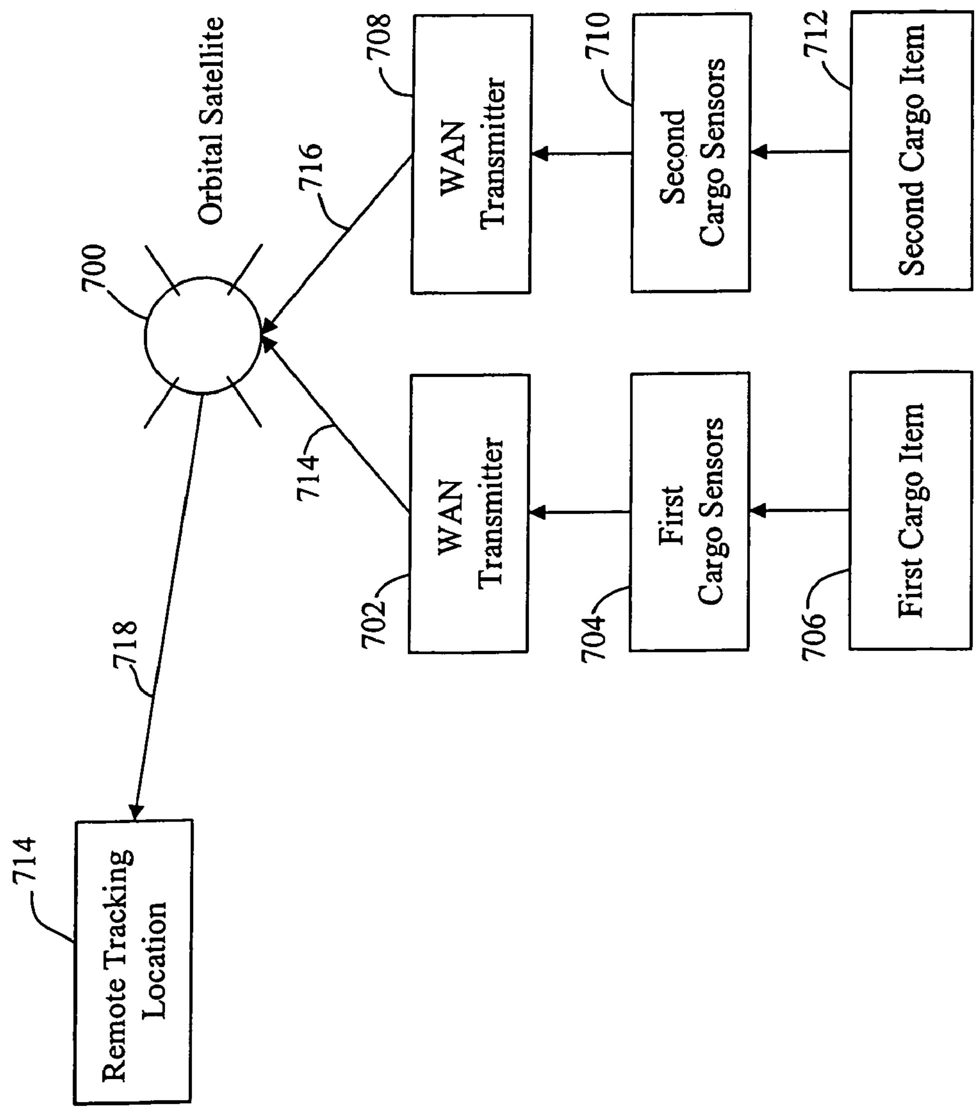
FIG. 7 is a block diagram of a cargo management communication system in the background art.
Figure 8:
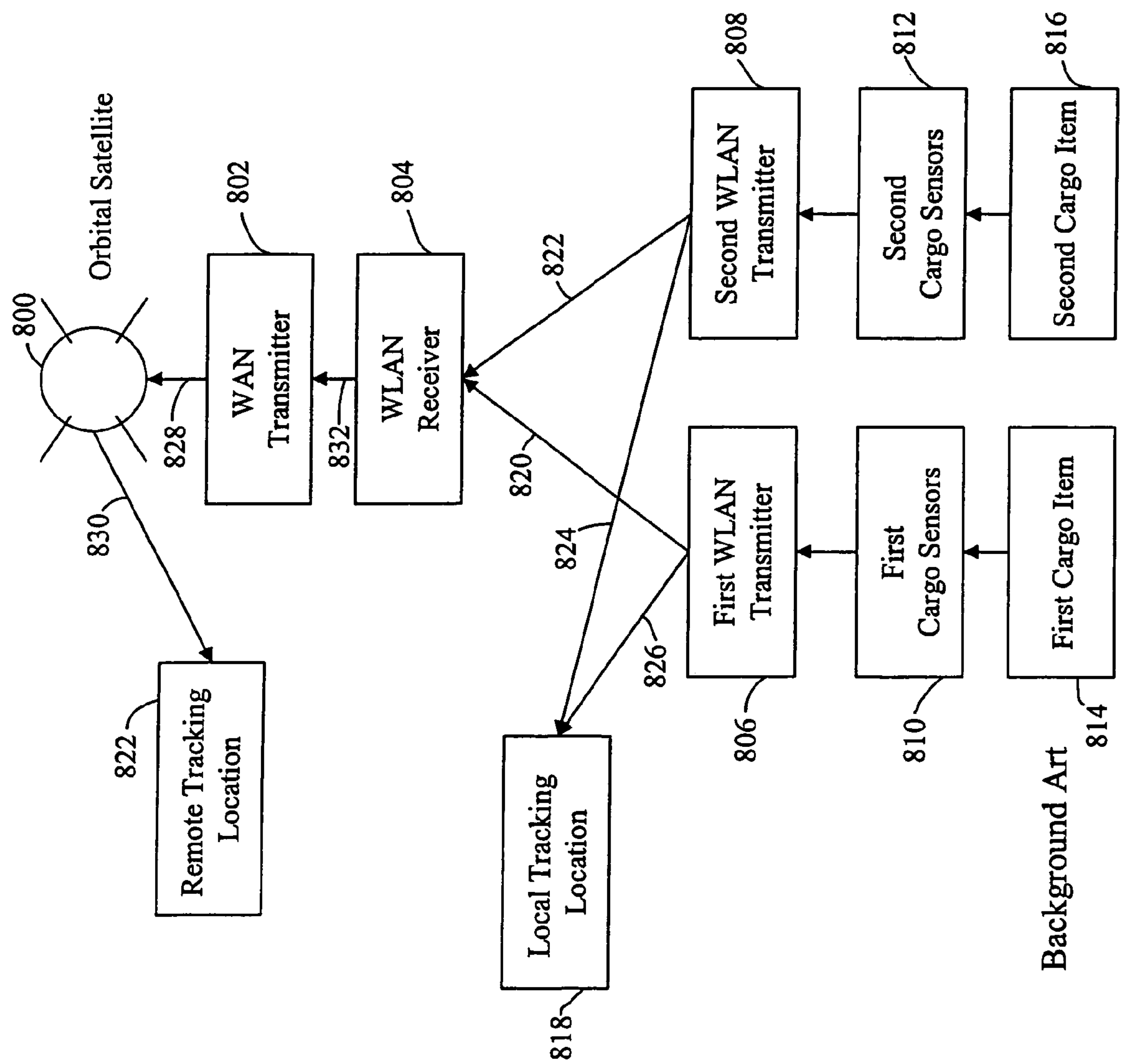
FIG. 8 is a block diagram of another cargo management communication system in the background art.

FIG. 6 shows an example of a WLAN/WAN repeater 600 according to an embodiment of the present invention. The WLAN/WAN repeater 600 includes WLAN receiver 604 operatively connected to WAN transmitter 602. The WLAN receiver 604 is configured to receive WLAN signals and the WAN transmitter is configured to rebroadcast the received WLAN signals at a higher power level to produce WAN signals.

Numerous modifications and variations of the present invention are possible in light of the above teachings. It is therefore to be understood that within the scope of the appended claims, the invention may be practiced otherwise than as specifically described herein.

The invention claimed is:

1. A communication system comprising:

a local area network (LAN) radio transmitter configured to transmit a first message having a first frequency spectrum; and a wide area network (WAN) uplink device configured to receive the first message from the LAN radio transmitter and transmit a second message having a second frequency spectrum overlapping the first frequency spectrum to a WAN receiver using an orbital satellite; wherein the LAN radio transmitter and the WAN uplink device are configured to transmit the first and second message with at least one of a different modulation, a different Code Division Multiple Access (CDMA) code, and a different frequency hop pattern, the WAN uplink device is further configured to transmit the second message at a second power sufficient for the orbital satellite to demodulate the second message, and the LAN radio transmitter is further configured to transmit the first message at a first power less than the second power and insufficient for the orbital satellite to demodulate the first message.

2. The communication system of claim 1, wherein the WAN receiver includes an error correcting code device, the WAN uplink device is further configured to transmit the second message having a second message length that the error correcting code device in the WAN receiver is configured to accept, and the LAN radio transmitter is further configured to transmit the first message having a first message length that is shorter than the second message length and that the error correcting code device in the WAN receiver is configured to reject.

3. The communication system of claim 1, wherein the WAN uplink device is further configured to transmit the second message using a second code division multiple access code that the orbital satellite is configured to receive, and the LAN radio transmitter is further configured to transmit the first message using a first code division multiple access code that the orbital satellite is configured not to receive.

4. The communication system of claim 3, wherein the first code division multiple access code includes at least one of a first direct sequence spread spectrum hop pattern code and a first frequency hopping spread spectrum hop pattern code, and the second code division multiple access code includes at least one of a second direct sequence spread spectrum hop pattern code and a second frequency hopping spread spectrum hop pattern code.

5. The communication system of claim 1, further comprising:

a cargo sensor configured to sense a cargo information and operatively connected to the LAN radio transmitter, and the LAN radio transmitter is further configured to add the sensed cargo information to the first message.

6. The communication system of claim 5, wherein the cargo sensor includes at least one of a GPS receiver, a container temperature sensor, a container door open sensor, a container volume sensor, a container vibration/shock sensor, a container accelerometer, a container acoustic pressure sensor, a container sound sensor, a light-in-container sensor, an infrared sensor, a microwave sensor, a dust sensor, a humidity sensor, a security/tampering sensor, and an orientation sensor.

7. The communication system of claim 1, wherein the LAN radio transmitter is further configured to transmit the first message at a scheduled time or a random rate.

8. The communication system of claim 1, wherein the first frequency spectrum is the same as the second frequency spectrum.

9. The communication system of claim 1, wherein the first message includes a spread spectrum modulated LAN message and the second message includes a spread spectrum modulated WAN message.

10. A network communication device, comprising:

a local area network (LAN) radio receiver configured to receive a first message having a first frequency spectrum; and a wide area network (WAN) transmitter configured to transmit a second message having a second frequency spectrum overlapping the first frequency spectrum to a WAN receiver using an orbital satellite; wherein the WAN transmitter is further configured to transmit the second message with at least one of a different modulation, a different Code Division Multiple Access (CDMA) code, and a different frequency hop pattern comparing to the first message received by the LAN radio receiver, and to transmit the second message at a second power sufficient for the orbital satellite to demodulate the second message, and the first message has a first power that is lower than the second power and is insufficient for the orbital satellite to demodulate the first message.

11. The communication device of claim 10, further configured to transmit the second message having a second message length that an error correcting code device in the wide area network receiver is configured to accept, and the first message includes a first message length that is shorter than the second message length and that the error correcting code device in the wide area network receiver is configured to reject.

12. The communication device of claim 10, further configured to transmit the second message using a second code division multiple access code that the orbital satellite is configured to receive, and the first message includes a first code division multiple access code that the orbital satellite is configured not to receive.

13. The communication system of claim 12, wherein the first code division multiple access code includes at least one of a first direct sequence spread spectrum hop pattern code and a first frequency hopping spread spectrum hop pattern code, and the second code division multiple access code includes at least one of a second direct sequence spread spectrum hop pattern code and a second frequency hopping spread spectrum hop pattern code.

14. The communication device of claim 10, wherein the first frequency spectrum is the same as the second frequency spectrum.

15. The communication device of claim 10, wherein the first message includes a spread spectrum modulated LAN message and the second message includes a spread spectrum modulated WAN message.

16. A network communication device comprising:

a local area network/wide area network (LAN/WAN) radio transmitter configured to transmit a first LAN message having a first frequency spectrum and to transmit a WAN message having a second frequency spectrum overlapping the first frequency spectrum to a WAN receiver using an orbital satellite; and a LAN radio receiver configured to receive a second LAN message having the first frequency spectrum;

a sensor interface configured to receive a sensed cargo information from an operatively connected cargo sensor and add the sensed cargo information to the first LAN message;

wherein the LAN/WAN radio transmitter is further configured to transmit the second LAN message with at least one of a different modulation, a different Code Division Multiple Access (CDMA) code, and a different frequency hop pattern, comparing to at least one of the first LAN message transmitted by the LAN/WAN radio transmitter, the second LAN message received by the LAN radio receiver, and the LAN/WAN radio transmitter is further configured to transmit the first WAN message at a first power sufficient for the orbital satellite to demodulate the first WAN message, and transmit the second LAN message at a second power lower than the first power and insufficient for the orbital satellite to demodulate the second LAN message.

17. The communication device of claim 16, wherein the LAN/WAN radio transmitter is further configured to transmit the WAN message having a first message length that an error correcting code device in the WAN receiver is configured to accept, and transmit the first LAN message having a second message length that the error correcting code device in the WAN receiver is configured to reject, and the second LAN message includes the second message length.

18. The communication device of claim 16, wherein the LAN/WAN radio transmitter is further configured to transmit the WAN message using a first code division multiple access code that the orbital satellite is configured to receive, and transmit the first LAN message using a second code division multiple access code that the orbital satellite is not configured to receive, and the second LAN message includes the second code division multiple access code.

19. The communication device of claim 18, wherein the first code division multiple access code includes at least one of a first direct sequence spread spectrum hop pattern code and a first frequency hopping spread spectrum hop pattern code, and the second code division multiple access code includes at least one of a second direct sequence spread spectrum hop pattern code and a second frequency hopping spread spectrum hop pattern code.

20. The communication device of claim 16, wherein the cargo sensor includes at least one of a GPS receiver, a container temperature sensor, a container door open sensor, a container volume sensor, a container vibration/shock sensor, a container accelerometer, a container acoustic pressure sensor, a container sound sensor, a light-in-container sensor, an infrared sensor, a microwave sensor, a dust sensor, a humidity sensor, a security/tampering sensor, and an orientation sensor.

21. The communication device of claim 16, wherein the LAN radio transmitter is further configured to transmit the first LAN message at a scheduled time or a random rate.

22. The communication device of claim 16, wherein the first frequency spectrum is the same as the second frequency spectrum.

23. The communication device of claim 16, wherein the first and second LAN messages include a spread spectrum modulated LAN message and the WAN message includes a spread spectrum modulated WAN message.

24. A network communication device, comprising:

a local area network (LAN) radio transmitter configured to transmit a first message having a first frequency spectrum overlapping a second frequency spectrum of a second message received by an orbital satellite; and a sensor interface configured to receive a sensed cargo information from an operatively connected cargo sensor and add the sensed cargo information to the spread spectrum local area network radio message; wherein the LAN radio transmitter is further configured to transmit the second message with at least one of a different modulation, a different Code Division Multiple Access (CDMA) code, and a different frequency hop pattern comparing to the second message received by the satellite receiver, and the LAN radio transmitter is further configured to transmit the first message at a first power insufficient for the orbital satellite to demodulate the first message, and to transmit the second message at a second power lower than the first power and insufficient for the orbital satellite to demodulate the second message.

25. The communication device of claim 24, wherein the LAN radio transmitter is further configured to transmit the first message having a message length that an error correcting code device in a WAN receiver that communicates with the orbital satellite is configured to reject.

26. The communication device of claim 24, wherein the LAN radio transmitter is further configured to transmit the first message using a code division multiple access code that the orbital satellite is not configured to receive.

27. The communication device of claim 26, wherein the code division multiple access code includes at least one of a direct sequence spread spectrum hop pattern code that the orbital satellite is not configured to receive and a frequency hopping spread spectrum hop pattern code that the orbital satellite is not configured to receive.

28. The communication device of claim 24, wherein the cargo sensor includes at least one of a GPS receiver, a container temperature sensor, a container door open sensor, a container volume sensor, a container vibration/shock sensor, a container accelerometer, a container acoustic pressure sensor, a container sound sensor, a light-in-container sensor, an infrared sensor, a microwave sensor, a dust sensor, a humidity sensor, a security/tampering sensor, and an orientation sensor.

29. The communication device of claim 24, wherein the LAN radio transmitter is further configured to transmit the first message at a scheduled time or a random rate.

30. The communication device of claim 24, wherein the first frequency spectrum is the same as the second frequency spectrum.

31. The communication device of claim 24, wherein the first message includes a spread spectrum modulated LAN message and the second message includes a spread spectrum modulated WAN message.

32. A communication method, comprising steps of:

transmitting a first message having a first frequency spectrum from a local area network (LAN) radio transmitter, the first message being transmitted at a first power;

receiving the first message from the LAN radio transmitter at a wide area network (WAN) uplink device; and transmitting a second message having a second frequency spectrum overlapping the first frequency spectrum to a WAN receiver using an orbital satellite, the second message being transmitted from the WAN uplink device at a second power sufficient for the orbital satellite to demodulate the second message;

wherein at least one of the transmitting a first message and transmitting a second message further comprising transmitting the first and second messages with at least one of a different modulation, a different Code Division Multiple Access (CDMA) code, and a different frequency hop pattern, and the first power is lower than the second power, and is insufficient for the orbital satellite to demodulate the first message.

33. The communication method of claim 32, wherein the WAN receiver includes an error correcting code device, the method further comprising the steps of:

transmitting the second message from the WAN uplink device with a second message length that the error correcting code device in the WAN receiver is configured to accept; and transmitting the first message from the LAN radio transmitter with a first message length that is shorter than the second message length and that the error correcting code device in the WAN receiver is configured to reject.

34. The communication method of claim 32, further comprising steps of:

transmitting the second message from the WAN uplink device using a second code division multiple access code that the orbital satellite is configured to receive; and transmitting the first message from the LAN radio transmitter using a first code division multiple access code that the orbital satellite is not configured to receive.

35. The communication method of claim 34, wherein the first code division multiple access code includes at least one of a first direct sequence spread spectrum hop pattern code and a first frequency hopping spread spectrum hop pattern code, and the second code division multiple access code includes at least one of a second direct sequence spread spectrum hop pattern code and a second frequency hopping spread spectrum hop pattern code.

36. The communication method of claim 32, further comprising steps of:

receiving a sensed cargo information from a cargo sensor operatively connected to the LAN radio transmitter; and adding the sensed cargo information to the first message.

37. The communication method of claim 36, wherein the cargo sensor includes at least one of a GPS receiver, a container temperature sensor, a container door open sensor, a container volume sensor, a container vibration/shock sensor, a container accelerometer, a container acoustic pressure sensor, a container sound sensor, a light-in-container sensor, an infrared sensor, a microwave sensor, a dust sensor, a humidity sensor, a security/tampering sensor, and an orientation sensor.

38. The communication method of claim 32, further comprising steps of:

transmitting the first message at a scheduled time or a random rate from the LAN radio transmitter.

39. The communication method of claim 32, wherein the first frequency spectrum is the same as the second frequency spectrum.

40. The communication method of claim 32, wherein the first message includes a spread spectrum modulated LAN message and the second message includes a spread spectrum modulated WAN message.

41. A communication system comprising:

a local area network/wide area network (LAN/WAN) radio transmitter configured to transmit a first message having a first frequency spectrum and transmit a second message having a second frequency spectrum overlapping a first frequency spectrum to a WAN receiver using an orbital satellite; and the LAN/WAN radio transmitter is further configured to transmit the first message with at least one of a different modulation, a different Code Division Multiple Access (CDMA) code, and a different frequency hop pattern comparing to the second message received by the WAN receiver or the orbital satellite, and the LAN/WAN radio transmitter is further configured to transmit the first message at a first power sufficient for the orbital satellite to demodulate the first WAN message, and transmit the second message at a second power lower than the first power and insufficient for the orbital satellite to demodulate the second message.

* * * * *